(12) United States Patent
Lu et al.

(10) Patent No.: US 10,142,318 B2
(45) Date of Patent: Nov. 27, 2018

(54) SELF-ADAPTIVE COMMUNICATION METHOD FOR ENCRYPTION DONGLE

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 155 days.

(21) Appl. No.: 15/502,865

(22) PCT Filed: Aug. 21, 2015

(86) PCT No.: PCT/CN2015/087741
§ 371 (c)(1),
(2) Date: Feb. 9, 2017

(87) PCT Pub. No.: WO2016/034047
PCT Pub. Date: Mar. 10, 2016

(65) Prior Publication Data
US 2017/0237728 A1    Aug. 17, 2017

(30) Foreign Application Priority Data
Sep. 1, 2014   (CN) .......................... 2014 1 0440242

(51) Int. Cl.
*H04L 29/06*     (2006.01)
*G06F 21/56*     (2013.01)
(Continued)

(52) U.S. Cl.
CPC .......... *H04L 63/0807* (2013.01); *G06F 13/24* (2013.01); *G06F 21/12* (2013.01);
(Continued)

(58) Field of Classification Search
CPC ..... H04L 63/0807; H04L 63/205; H04L 9/06; G06F 13/24; G06F 21/12; G06F 21/34;
(Continued)

(56) References Cited

U.S. PATENT DOCUMENTS 7,761,384 B2 * 7/2010 Madhogarhia .......... G06F 21/32
705/75
7,899,185 B2 * 3/2011 McGough ............. H04L 63/062
380/277
(Continued)

FOREIGN PATENT DOCUMENTS

CN    103677812 A  *  3/2014

*Primary Examiner* — Yonas A Bayou
(74) *Attorney, Agent, or Firm* — Hammer & Associates, P.C.

(57) ABSTRACT

A self-adaptive communication method for an encryption dongle, comprising: an upper-layer software platform sets communication mode information of self, when connection of an encryption dongle to a host is detected, acquires communication mode information of the encryption dongle, determines whether or not the communication mode information of self matches the communication mode information of the encryption dongle, if yes, then communicates with the encryption dongle via an interrupt transmit pipeline, and if not, then transmits a communication instruction to the encryption dongle via a control transmit pipeline; the encryption dongle sets a communication mode identifier on the basis of the communication mode information of the upper-layer software platform in the communication instruction, and, the encryption dongle resets and resets communication mode information of self on the basis of the communication mode identifier. As such, when connection of the encryption dongle to the host is re-detected, the upper-layer software platform re-acquires the communication mode information of the encryption dongle, determines that the communication mode information is a match, and
(Continued)

then communicates via the interrupt transmission pipeline, thus solving the technical problem that an existing encryption dongle can only support one communication mode of the host, and implementing self-adaptive communication for the encryption dongle.

16 Claims, 8 Drawing Sheets

(51) Int. Cl.
*G06F 13/24* (2006.01)
*G06F 21/12* (2013.01)
*H04L 9/06* (2006.01)
*G06F 21/34* (2013.01)
*G06F 21/60* (2013.01)

(52) U.S. Cl.
CPC ............ *G06F 21/34* (2013.01); *G06F 21/566* (2013.01); *H04L 9/06* (2013.01); *H04L 63/205* (2013.01); *G06F 21/602* (2013.01); *G06F 2221/034* (2013.01)

(58) Field of Classification Search
CPC .................. G06F 21/566; G06F 21/602; G06F 2221/034
See application file for complete search history.

(56) References Cited

U.S. PATENT DOCUMENTS

| | | | | |
|---|---|---|---|---|
| 8,195,959 | B2* | 6/2012 | Eldridge | G06F 21/6218 380/286 |
| 8,447,983 | B1* | 5/2013 | Beck | H04L 9/0894 705/65 |
| 8,689,355 | B1* | 4/2014 | Neelakanta | H04L 63/0876 713/165 |
| 8,826,396 | B2* | 9/2014 | Jancula | G06F 21/46 726/6 |
| 9,807,117 | B2* | 10/2017 | Pope | H04L 63/06 |
| 2003/0131073 | A1* | 7/2003 | Lucovsky | G06F 21/335 709/219 |
| 2003/0208397 | A1* | 11/2003 | VanDusen | G06Q 10/06 705/14.27 |
| 2004/0148274 | A1* | 7/2004 | Warnock | G06K 9/00469 |
| 2005/0129246 | A1* | 6/2005 | Gearhart | G06F 21/34 380/278 |
| 2005/0240593 | A1* | 10/2005 | D'Alo | G06F 9/468 |

* cited by examiner

SELF-ADAPTIVE COMMUNICATION METHOD FOR ENCRYPTION DONGLE

FIELD OF THE INVENTION

The present invention relates to a self-adaptive method for communication of dongle which belongs to the field of information security.

PRIOR ART

With the development of the information security, a dongle is applied in the information security more frequently. The dongle is an encryption device which links to a Universal Serial Bus (USB) interface, and the dongle integrates software with hardware. Generally speaking, the dongle provides non-volatile memory space for a host to read and write, the host can communicate with the dongle via an upper software flat to read and write in the dongle. At the moment, the transmission channels for communicating between the dongle and the host mainly include an interrupt-transmission-channel and a control-transmission-channel. When connecting to the host, the dongle can communicate with the host via a control-transmission-channel, for example, the dongle performs enumeration and configuration between the host and itself via the control-transmission-channel. However, the dongle cannot communicate with the host via the interrupt-transmission-channel to realize reading and writing by the host in the dongle unless the dongle works with the upper software flat installed in the host, furthermore, only if a communication mode needed by the host matches a communication mode supported by the dongle, the host can communicate with the dongle normally via the upper software flat. In prior art, because types of main board vary from each other, the communication mode needed by the host includes a communication of 64 bytes and a communication mode of 32 bytes, etc; at the moment, the dongle can only support one type of communication mode during communication, that means, if the dongle supports the communication mode of 64 bytes, it can only communicate with the host, of which the communication mode is 64 bytes.

SUMMARY OF THE INVENTION

The object of the present invention is to provide a self-adaptive method communication of a dongle, which applies in a system which includes a dongle and a host, in which, an upper software flat is installed in the host, by the method, the problem that the dongle can only effectively communicate with a host of one communication mode is solved.

Thus, according to one aspect of the present invention, there is provided a self-adaptive method for communication of a dongle, wherein the upper software flat executes the following steps:

Step s1, setting, by the upper software flat, information of a communication mode of the upper software flat according to a type of a main board of the host;

Step s2, obtaining, by the upper software flat, information of the a communication mode of the dongle according to enumeration information returned from the dongle to the host, when any connection between the dongle and the host is detected;

Step s3, determining, by the upper software flat, whether the information of the communication mode of itself matches the information of the communication mode of the dongle, if yes, executing Step s5; otherwise, executing Step s4;

Step s4, sending, by the upper software flat, a communication instruction which includes the information of the communication mode of the upper software flat to the dongle via a control-transmission-channel, returning to Step s2; and Step s5, communicating, by the upper software flat, with the dongle effectively via the interrupt-transmission-channel according to the information of the communication mode of the upper software flat; and the dongle executes the following steps:

Step r1, setting, by the dongle, information of a communication mode of the dongle according to a communication mode identification of the dongle, performing an enumeration, returning enumeration information to the host after the enumeration is finished, and waiting for communicating with the upper software flat;

Step r2, executing Step r5 in the case that the dongle receives information sent from the upper software flat via the interrupt-transmission-channel; executing Step r3 in the case that the dongle receives information sent from the upper software flat via the control-transmission-channel;

Step r3, setting, by the dongle, the communication mode identification of the dongle according to the information of the communication mode of the upper software flat in the communication instruction sent from the upper software flat;

Step r4, resetting the dongle, then returning to Step r1; and

Step r5, communicating, by the dongle, with the upper software flat effectively via the interrupt-transmission-channel according to the information of the communication mode of the dongle.

According to another aspect of the present invention, there is provided a self-adaptive method for communication of a dongle, in which the upper software flat executes the following steps:

Step s1, setting, by the upper software flat, the information of the communication mode of the upper software flat according to the type of the main board of the host;

Step s2, obtaining, by the upper software flat, the information of the communication mode of the dongle according to the enumeration information returned from the dongle to the host, when a connection between the dongle and the host is detected by the upper software flat;

Step s3, determining, by the upper software flat, whether the information of the communication mode of the upper software flat matches the information of the communication mode of the dongle, if yes, executing Step s5; otherwise, executing Step s4;

Step s4, sending, by the upper software flat, the communication instruction which includes the information of the communication mode of the upper software flat to the dongle via the control-transmission-channel, waiting for receiving set-state information returned from the dongle, outputting prompt information to pull out or insert the dongle again when the set-state information returned from the dongle is received, returning to Step s2; and Step s5, communicating, by the upper software flat, with the dongle effectively via the interrupt-transmission-channel according to the information of the communication mode of the upper software flat; and the dongle executes the following steps:

Step r1, setting, by the dongle, the information of the communication mode of the dongle according to the communication mode identification, performing the enumeration, returning the enumeration information to the host after the enumeration is finished, and waiting for communicating with the upper software flat;

Step r2, executing Step r5 in the case that the dongle receives the information sent from the upper software flat via the interrupt-transmission-channel; executing Step r3 in the case that the dongle receives the communication instruction sent from the upper software flat via the control-transmission-channel;

Step r3, setting, by the dongle, the communication mode identification of the dongle according to the information of the communication mode of the upper software flat in the communication instruction sent from the upper software flat;

Step r4, returning, by the dongle, the set-state information to the upper software flat, executing Step r5; and Step r5, communicating, by the dongle, with the upper software flat.

According to the third aspect of the present invention, there is provided a self-adaptive method for communication of a dongle, in which the upper software flat executes the following steps:

Step s1, setting, by the upper software flat, information of a communication mode of the upper software flat according to a type of a main board of the host;

Step s2, sending, by the upper software, a communication instruction which includes the information of the communication mode of the upper software flat to the dongle via a control-transmission-channel when the connection between the upper software flat and the dongle is detected by the upper software flat;

Step s3, waiting, by the upper software flat, for receiving response information returned from the dongle;

Step s4, determining, by the upper software flat, whether the received response information returned from the dongle is a first response information, if yes, executing Step s5; otherwise, returning to Step s2; and Step s5, communicating, by the upper software, with the dongle effectively via an interrupt-transmission-channel according to the information of the communication mode of the upper software flat; and the dongle executes the following steps:

Step r1, setting, by the dongle, information of a communication mode of itself according to a communication mode identification of the dongle, performing an enumeration, returning enumeration information to the host after the enumeration is finished, and waiting for communicating with the upper software flat;

Step r2, receiving, by the dongle, the communication instruction sent from the upper software flat via the control-transmission-channel;

Step r3, determining, by the dongle, whether the information of communication mode of the dongle matches the information of the communication mode of the upper software flat in the communication instruction sent from the upper software flat, if yes, executing Step r6; otherwise, executing Step r4;

Step r4, setting, by the dongle, the communication mode identification of itself according to the information of the communication mode of the upper software flat;

Step r5, resetting the dongle, then returning to Step r1; and

Step r6, returning, by the dongle, the first response information to the upper software flat, waiting for communicating effectively with the upper software flat via the interrupt-transmission-channel according to the information of the communication mode of the dongle.

According to the fourth aspect of the present invention, there is provided a self-adaptive method for communication of a dongle, in which the upper software flat executes the following steps:

Step s1, setting, by the upper software flat, information of a communication mode of the upper software flat according to a type of a main board of the host;

Step s2, sending, by the upper software flat, a communication instruction which includes the information of the communication mode of the upper software flat to the dongle via a control-transmission-channel when the connection between the upper software flat and the dongle is detected;

Step s3, waiting, by the upper software flat, for receiving response information returned from the dongle;

Step s4, determining, by the upper software flat, a type of the received response information returned from the dongle, executing Step s5 in the case that the received response information is a first response information; outputting prompt information to pull out or insert the dongle again in the case that the received response information is a second response information, and returning to Step s2; and Step s5, communicating, by the upper software flat, with the dongle effectively via an interrupt-transmission-channel according to the information of the communication mode of the upper software flat; and the dongle executes the following steps:

Step r1, setting, by the dongle, information of a communication mode of the dongle according to a communication mode identification of the dongle, performing an enumeration, returning the enumeration information to the host after the enumeration is finished, and waiting for communicating with the upper software flat;

Step r2, receiving, by the dongle, the communication instruction sent from the upper software flat via the control-transmission-channel;

Step r3, determining, by the dongle, whether the information of the communication mode of the dongle matches the information of the communication mode of the upper software flat in the communication instruction sent from the upper software flat, if yes, the dongle returning the first response information to the upper software flat, and executing Step r6; otherwise, executing Step r4;

Step r4, setting, by the dongle, the communication mode identification of itself according to the information of the communication mode of the upper software flat;

Step r5, returning, by the dongle, the second response information to the upper software flat, executing Step r6; and Step r6, waiting, by the dongle, for communicating with the upper software flat.

According to the present invention, a dongle in the self-adaptive method for communication of a dongle can effectively communicate with a host needing every communication modes by interacting with the upper software flat to set the communication mode identification of the dongle. In this way, the method solves the problem that the dongle can only effectively communicate with the host of one communication mode.

BRIEF DESCRIPTION OF THE ACCOMPANYING DRAWINGS

DETAILED DESCRIPTION OF THE INVENTION

The technical solutions in the Embodiments of the present invention are further described more clearly and completely with the drawings in the Embodiments of the present invention. Apparently, Embodiments described herein are just a few Embodiments of the present invention. On the basis of Embodiments of the invention, all other related Embodiments made by those skilled in the art without any inventive work belong to the scope of the invention.

Embodiment 1

Embodiment 1 of the present invention provides a self-adaptive method for communication of a dongle, which applies in a system including a dongle and a host which installs an upper software flat.

Figure 1:
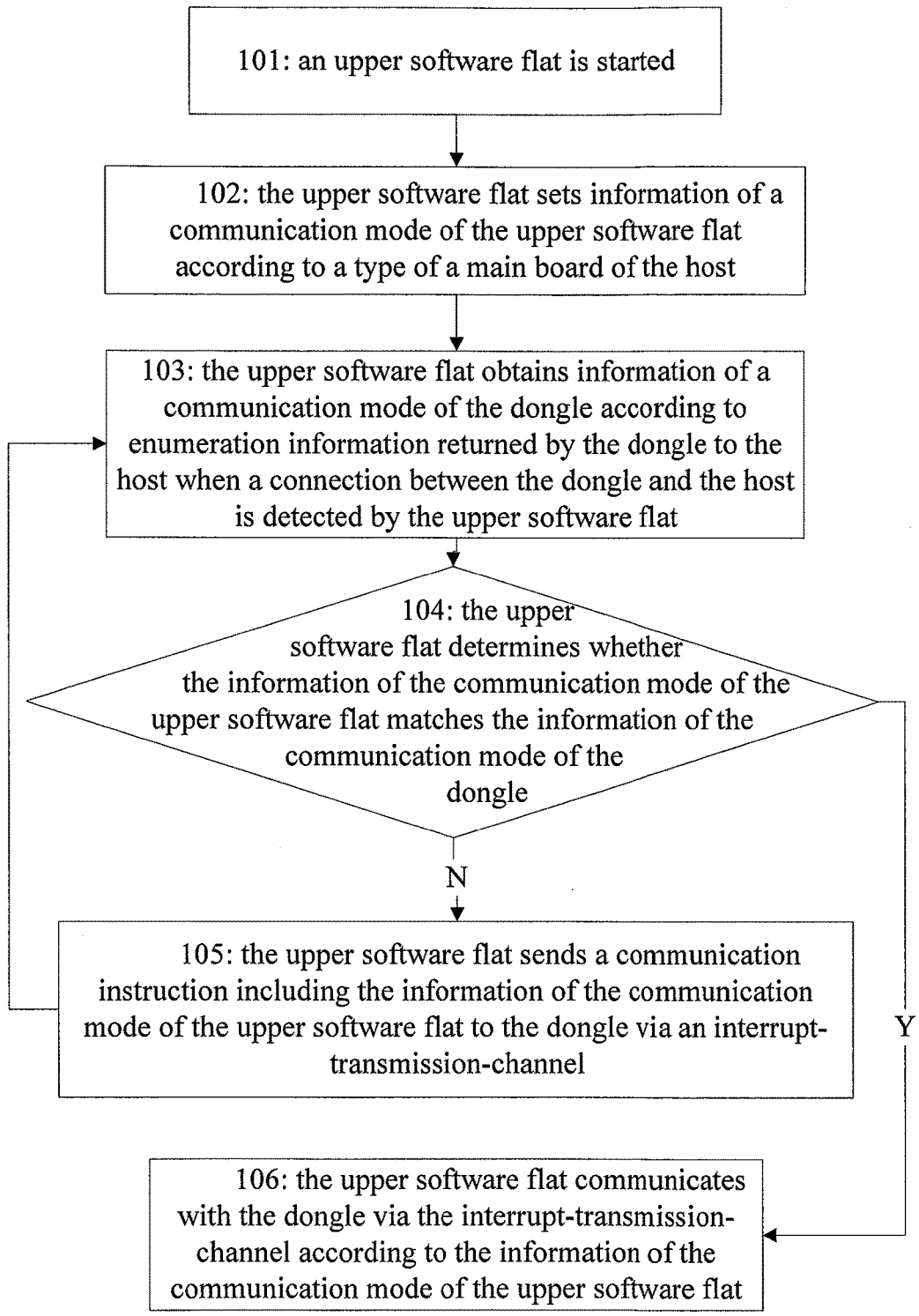
FIG. 1 shows a flow chart of specific operations of an upper software flat in a self-adaptive method for communication of a dongle according to Embodiment 1 of the present invention.

As shown in FIG. 1, in said method, the upper software flat executes following steps:

Step 101, the upper software flat is started;

Specifically, the upper software flat, which is installed in the host, is configured to interact with the dongle to set up an effective communication between the host and the dongle. The effective communication between the host and the dongle in the invention includes operations of reading from and writing into, by the host, the dongle, the operations is done via an interrupt-transmission-channel. The host and the dongle cannot communicate effectively unless a communication mode of the host matches a communication mode of the dongle because the characteristics of the interrupt-transmission-channel.

The host in the present invention includes: a personal computer, a personal digital assistant and a mobile computer, etc.

Step 102, information of a communication mode of the upper software flat is set by the upper software flat according to a type of a main board of the host;

in the present Embodiment 1, Step 102 specifically includes:

Step a1, the type of the main board of the host is obtained by the upper software flat via operating system tools of the host;

in which, the operating system of the host may be Windows operating system, Linux operating system, etc; the types of the main board of the host include: GIGABYTE, ASUS, MSI, COLORFUL, ONDA, and BIOSTAR, etc.

Specifically, the type of the main board of the host is obtained by the upper software flat via ManagementObjectSearcher class in an interface provided by a software development kit (SDK) which under the Windows operating system in the case that the operating system of the host is the Windows operating system. The type of the main board of the host is obtained by the upper software flat by invoking a dmidecode command provided by a Shell script under the Linux operating system in the case that the operating system of the host is the Linux operating system.

Step a2, a communication mode needed by the host is obtained by the upper software flat according to the type of the main board;

Specifically, in the present Embodiment 1, the upper software flat obtains the communication mode needed by the host by searching from a preset list, in which, the preset list can only include the type of the main board of the host by which the communication mode needed is the communication mode of 32 bytes; or the preset list could only include the type of the main board of the host, by which, the communication mode needed is the communication mode of 64 bytes; the preset list can also include the type of the main board and the communication mode needed by the host which uses the type of the main board.

Preferably, in the present Embodiment 1, the preset list just includes the type of the main board of the host, by which the communication mode needed is the communication mode of 32 bytes, such as GIGABYTE; the upper software flat searches for the obtained type of the main board from the preset list after the type of the main board of the host is obtained, the communication mode needed by the host which obtains the main board is the communication mode of 32 bytes in the case that the obtained type of the main board is found; the communication mode needed by the host which obtains the main board is the communication mode of 64 bytes in the case that the obtained type of the main board is not found.

For example, the communication mode, needed by the host, which is obtained by the upper software flat by searching from the preset list is the communication mode of 32 bytes in the case that the type of the main board of the host obtained by the upper software flat is GIGABYTE.

Step a3, the information of the communication mode of the upper software flat is set by the upper software flat according to the communication mode needed by the host;

Specifically, the information of the communication mode of the upper software flat is set by the upper software flat as 32 in the case that the communication mode needed by the host is the communication mode of 32 bytes; the information of the communication mode of the upper software flat is set by the upper software flat as 64 in the case that the communication mode needed by the host is the communication mode of 64 bytes.

Step 103, the upper software flat obtains the information of the communication mode of the dongle according to enumeration information returned from the dongle to the host when the connection between the dongle and the host is detected by the upper software flat;

The step specifically includes: the upper software flat checks whether any dongle connects the host, the upper software flat obtains the information of the communication mode of the dongle according to the enumeration information returned from the dongle to the host in the case that a dongle is detected to connect the host; the upper software flat outputs information that no dongle is detected in the case that no connection between the dongle and the host is detected.

Specifically, after it is started, the upper software flat checks whether any dongle connects to the host, specifically checks whether any dongle-inserted information exists, if yes, the upper software flat obtains information, such as a vendor ID (VID), a product ID (PID), a transmission channel for communication and the number of communication bytes supported by the transmission channel, in the enumeration information returned from the dongle to the host, and compares the vendor ID and the product ID with a preset vendor ID and a preset product ID of the dongle respectively, in the case that the vendor ID and the product ID are the same as the preset vendor ID and the preset product ID of the dongle respectively, the number of communication bytes supported by the interrupt-transmission-channel is set by the upper software flat as the information of communication mode of the dongle, and Step 104 is executed; in the case that the vendor ID and the product ID are not same as the preset vendor ID and the preset product ID of the dongle respectively, the upper software flat outputs information that no dongle is detected; the upper software outputs the information that no dongle is detected in the case that no connection between the dongle and the host is detected, in which, the information that no dongle is detected, output by the upper software flat, can be displayed via an interface of the host.

Step 104, the upper software flat determines whether the information of the communication mode of itself matches the information of the communication mode of the dongle, if yes, Step 106 is executed; otherwise, Step 105 is executed;

Specifically, the upper software flat determines whether the information of the communication mode of itself is the same as the obtained information of the communication mode of the dongle, if yes, the information of the communication mode of the upper software flat matches the information of the communication mode of the dongle; otherwise, the information of the communication mode of the upper software flat does not match the information of the communication mode of the dongle.

For instance, the upper software flat determines that the information of the communication mode of itself matches the information of the communication mode of the dongle in the case that the communication mode information of the upper software flat is 64 and the obtained communication mode information of the dongle is 64;

while the upper software flat determines that the communication mode information of itself does not match the communication mode information of the dongle in the case that the communication mode information of the upper software flat is 32 and the obtained communication mode information of the dongle is 64.

Step 105, the upper software flat sends a communication instruction which includes the information of the communication mode of the upper software flat to the dongle via a control-transmission-channel, and returns to Step 103;

Specifically, the upper software flat sets the communication instruction according to the information of the communication mode of itself, and sends the communication instruction which includes the information of the communication mode of the upper software flat to the dongle via the control-transmission-channel, in which, the communication instruction is composed of a series of setup packages which include the information of the communication mode of the upper software flat.

For instance, information in the setup packages specifically include: 0x 21 ff 20 00 00 00 00 00, in which, the third byte is the information of the communication mode, the third byte is set as 0x20 if the information of the communication mode of the upper software flat is 32; the third byte is set as 0x40 if the information of the communication mode of the upper software flat is 64.

It needs to be noted that the control-transmission-channel is a channel, via which the host communicates with the dongle through an endpoint 0 of the dongle; because of the characteristics of the control-transmission-channel, the host can communicate effectively with the dongle via the control-transmission-channel to finish configuration between the host and the dongle before the host can communicate with the dongle via the interrupt-transmission-channel.

Step 106, the upper software flat communicates with the dongle effectively via the interrupt-transmission-channel according to the information of the communication mode of the upper software flat.

Figure 2:
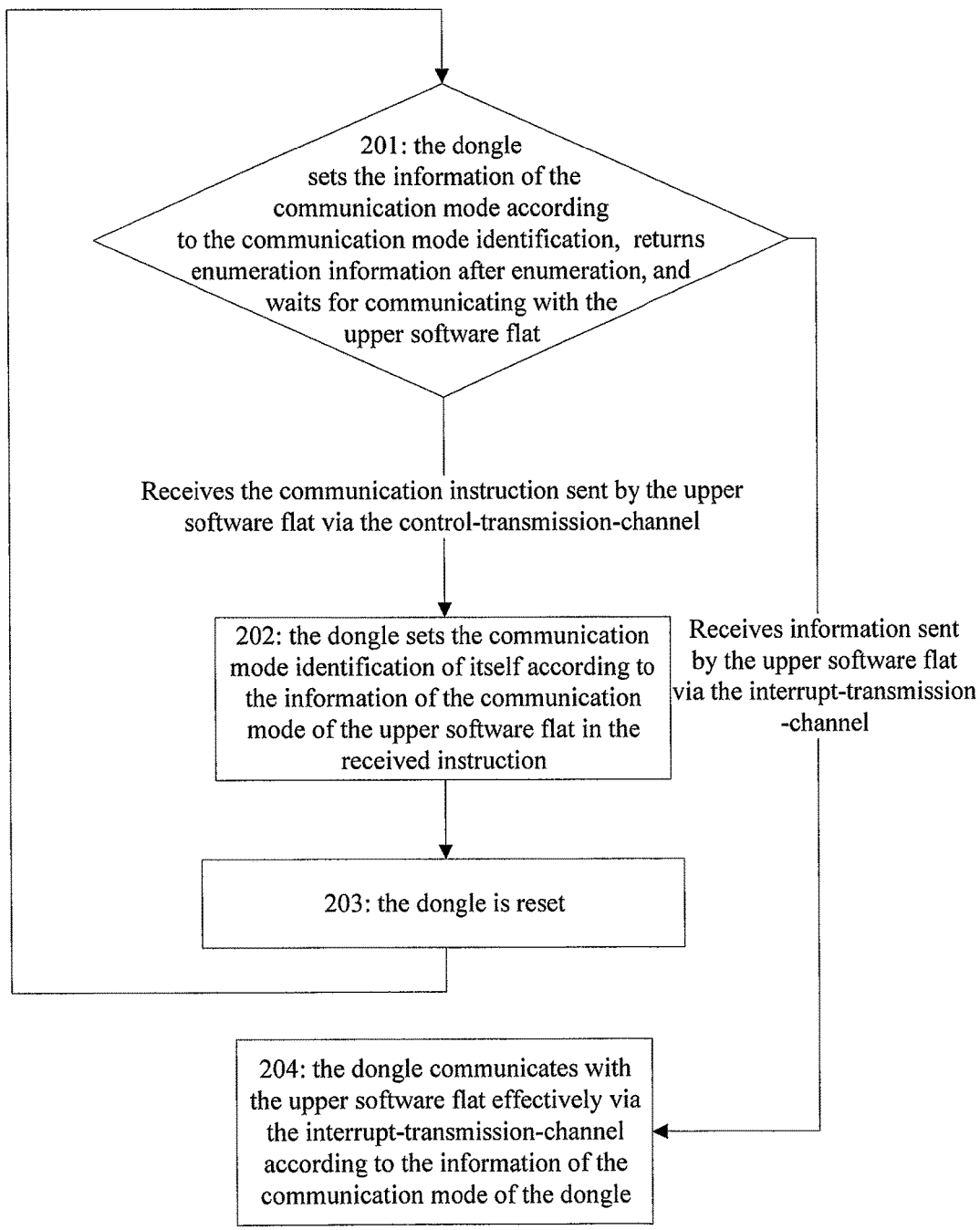
FIG. 2 shows a flow chart of specific operations of a dongle in the method for self-adaption communication of a dongle according to Embodiment 1 of the present invention.

As shown in FIG. 2, in the method, the dongle executes following steps:

Step 201, the dongle sets the information of the communication mode of the dongle according to a communication mode identification, performs an enumeration, returns enumeration information to the host after the enumeration is finished, waits for communicating with the upper software flat, Step 202 is executed in the case that the communication instruction sent from the upper software flat is received via the control-transmission-channel; Step 204 is executed in the case that the information sent from the upper software flat is received via the interrupt-transmission-channel;

Specifically, the dongle setting the information of the communication mode of the dongle according to the communication mode identification includes: the number of the communication bytes, supported by the interrupt-transmission-channel, in an endpoint descriptor and a report descriptor of the dongle is set as same as the communication mode identification, and the number of the communication bytes supported by the interrupt-transmission-channel is made as the information of the communication mode of the dongle. In the present Embodiment 1, the communication mode identification of the dongle is stored in a flag flash. For instance, the number of the communication bytes, supported by the interrupt-transmission-channel, in the endpoint descriptor and the report descriptor of the dongle is set by the dongle according to the communication mode identification as 64 in the case that the communication mode identification of the dongle is 64, thus, the information of the communication mode of the dongle is 64.

The number of the communication bytes, supported by the interrupt-transmission-channel, in the endpoint descriptor and the report descriptor of the dongle is set by the dongle according to the communication mode identification as 32 in the case that the communication mode identification of the dongle is 32, thus, the information of the communication mode of the dongle is 32.

It needs to be noted that, when it connects the host, the dongle sets the information of the communication mode of the dongle according to the communication mode identification, performs the enumeration, the dongle returns the enumeration information to the host after the enumeration is finished, and waits for communicating with the upper software flat, in which, the enumeration information includes the information, such as the transmission channel for the communication of the dongle, the number of the communication bytes supported by each transmission channel, the vendor ID (VID) of the dongle, and the product ID (PID).

Step 202, the dongle sets the communication mode identification of itself according to the information of the communication mode of the upper software flat in the received instruction;

Specifically, the dongle receives a series of setup packages sent from the upper software flat via the control-transmission-channel, the setup packages include the information of the communication mode of the upper software flat, the dongle sets the communication mode identification of itself as the same as the information of the communication mode of the upper software flat according to the information of the communication mode of the upper software flat.

For instance, the dongle resets the communication mode identification stored in the flag flash of the dongle as 32 in the case that the information of the communication mode of the upper software flat received by the dongle via the control-transmission-channel is 32.

Step 203, the dongle is reset, and Step 201 is returned to; Specifically, the dongle lowers an electrical level of a chip-reset-pin after the communication mode identification stored in the flag flash is reset by the dongle, a hardware of the dongle is reset.

Step 204, the dongle communicates with the upper software flat effectively via the interrupt-transmission-channel according to the information of the communication mode of the dongle.

In the present Embodiment 1, the upper software flat sets the information of the communication mode of the upper software flat according to the type of the main board of the host after the upper software flat is started, the upper software flat obtains the information of the communication mode of the dongle according to the enumeration information returned from the dongle to the host when the connection between the dongle and the host is detected by the upper software flat, the upper software flat determines whether the information of the communication mode of itself matches the obtained information of the communication mode of the dongle, if yes, the upper software flat communicates with the dongle effectively via the interrupt-transmission-channel according to the information of the communication mode of the upper software flat; otherwise, the upper software flat sends the communication instruction to the dongle via the control-transmission-channel, and then the dongle resets the communication mode identification of the dongle according to the information of the communication mode of the upper software flat in the instruction after the instruction is received by the dongle, the dongle is reset, and the dongle resets the information of the communication mode of the dongle according to the communication mode identification, and finishes the enumeration; the upper software flat will detect the connection between the dongle and the host again when the dongle is reset, and the upper software flat obtains the information of the communication mode of the dongle again, in this way, the upper software flat will determine that the information of the communication mode of itself is as same as the obtained information of the communication mode of the dongle, and the upper software flat communicates with the dongle effectively according to the information of the communication mode of the upper software flat. In this way, the present invention solves the problem in prior art that a dongle can only support one communication mode of the host, the dongle in the present invention can adapt for both of the communication modes, and can communicate with the host of both communication modes effectively.

Embodiment 2

Embodiment 2 of the present invention provides a self-adaptive method for communication of a dongle, which applies in a system including a dongle and a host in which an upper software flat is installed.

Figure 3:
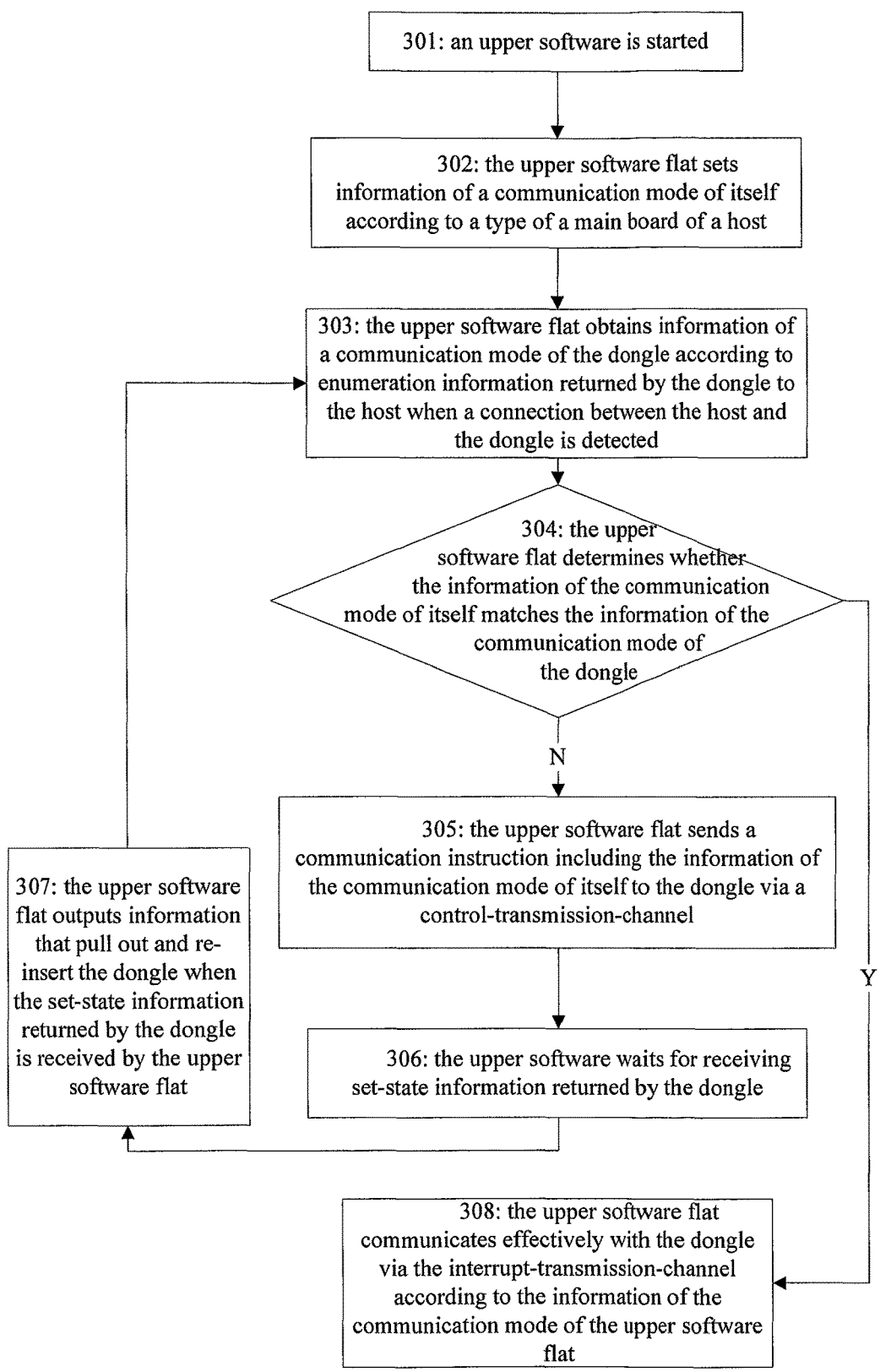
FIG. 3 shows a flow chart of specific operations of an upper software flat in a method for self-adaption communication of a dongle according to Embodiment 2 of the present invention.

As shown in FIG. 3, in the method, the upper software flat executes the following steps:

Step 301, the upper software flat is started;

Specifically, the upper software flat, installed in the host, is configured to interact with the dongle to set up effective communication between the host and the dongle. The effective communication between the host and the dongle in the present invention is done via an interrupt-transmission-channel, and the effective communication specifically includes operations, such as reading from and writing into the dongle, done by the host. The host and the dongle cannot communicate with each other effectively unless a communication mode of the host matches a communication mode of the dongle, because of the characteristics of the interrupt-transmission-channel.

The host in the present invention may be a personal computer, a personal digit assistant or a mobile computer, etc.

Step 302, the upper software flat sets information of the communication mode of the upper software flat according to a type of a main board of the host;

In the present Embodiment 2, Step 302 specifically includes:

Step a1, the upper software obtains the type of the main board of the host by operating system tools of the host;

in which, the operating systems of the host include Windows operating system, Linux operating system, etc; and the types of the main board of the host include: GIGABYTE, ASUS, MSI, COLORFUL, ONDA, BIOSTAR, etc.

Specifically, the upper software flat obtains the type of the main board of the host via ManagementObjectSearcher class in an interface provided by a software development kit (SDK) which is under the Windows operating system in the case that the operating system of the host is the Windows operating system; the upper software flat obtains the type of the main board of the host by invoking a dmindecode command provided by a shell script under the Linux operating system in the case that the operating system of the host is the Linux operating system.

Step a2, the upper software obtains a communication mode needed by the host according to the type of the main board;

Specifically, in Embodiment 2, the upper software flat can obtain the communication mode needed by the host by searching from a preset list, in which, the preset list can only include the type of the main board of the host by which the communication mode needed the communication mode of 32 bytes, or only include the type of the main board of the host by which the communication mode needed is the communication mode of 64 bytes, the preset list can also include the type of the main board and the communication mode needed by the host which uses the type of the main board.

Preferably, in the present Embodiment 2, the preset list only includes the type of the main board of the host by which the needed communication mode is the communication mode of 32 bytes, such as GIGABYTE; the upper software flat searches for the obtained type of the main board from the preset list after the type of the main board of the host is obtained, the communication mode needed by the host which obtains the main board is the communication mode of 32 bytes in the case that the obtained type of the main board is found; the communication mode needed by the host which obtains the main board is the communication mode of 64 bytes in the case that the obtained type of the main board is not found.

For example, the communication mode, needed by the host, which is obtained by the upper software flat by searching from the preset list is the communication mode of 32 bytes in the case that the type of the main board of the host obtained by the upper software flat is GIGABYTE.

Step a3, the upper software flat sets the information of the communication mode of the upper software flat according to the communication mode needed by the host;

Specifically, the information of the communication mode of the upper software flat is set by the upper software flat as 32 in the case that the communication mode needed by the host is the communication mode of 32 bytes; the information of the communication mode of the upper software flat is set by the upper software flat as 64 in the case that the communication mode needed by the host is the communication mode of 64 bytes.

Step 303, the upper software flat obtains information of the communication mode of the dongle according to enumeration information returned from the dongle to the host when a connection between the host and the dongle is detected by the upper software flat;

The step specifically includes: the upper software flat checks whether any dongle connects to the host, the upper software flat obtains the information of the communication mode of the dongle according to the enumeration information returned from the dongle to the host in the case that the connection between the dongle and the host is detected; the upper software flat outputs information that no dongle is detected in the case that no connection between the dongle and the host is detected.

Specifically, the upper software flat checks whether any dongle connects to the host after the upper software flat is started, the upper software flat specifically checks whether any dongle-inserted information is detected, if yes, the upper software flat obtains a vendor ID, a product ID, a transmission channel for communication and the number of communication bytes supported by each transmission channel from the enumeration information returned from the dongle to the host, and compares the vendor ID and the product ID with a preset vendor ID and a preset product ID of dongle respectively, the upper software flat makes the number of the communication bytes, which is supported by the interrupt-transmission-channel, as the information of the communication mode of the dongle, and executes Step 304 in the case that the vendor ID is same as the preset vendor ID of the dongle and the product ID is same as the preset product ID of the dongle; otherwise, the upper software flat outputs the information that no dongle is detected; if no connection between the host and the dongle is detected, the upper software flat outputs the information that no dongle is detected, in which, the information that no dongle is detected output by the upper software flat can be prompted through the interface of the host that no information of dongle can be detected.

Step 304, the upper software flat determines whether the information of the communication mode of itself matches the information of the communication mode of the dongle, if yes, Step 308 is executed; otherwise Step 305 is executed;

Specifically, the upper software flat determines whether the information of the communication mode of itself is as same as the obtained information of the communication mode of the dongle, if yes, the information of the communication mode of the upper software flat matches the information of the communication mode of the dongle; otherwise, the information of the communication mode of the upper software flat does not match the information of the communication mode of the dongle.

For instance, the upper software flat determines that the information of the communication mode of the upper software flat matches the information of the communication mode of the dongle in the case that both of the information of the communication mode of the upper software flat and the obtained information of the communication mode of the dongle are 64;

the upper software flat determines that the information of the communication mode of itself does not match the information of the communication mode of the dongle in the case that the information of the communication mode of the upper software flat is 32, while the information of the communication mode of the dongle is 64.

Step 305, the upper software flat sends a communication instruction including the information of the communication mode of the upper software flat to the dongle via a control-transmission-channel;

Specifically, the upper software flat sets the communication instruction according to the information of the communication mode of itself, and sends the communication instruction including the information of the communication mode of itself to the dongle via the control-transmission-channel, in which, the communication instruction is composed of a series of setup packages which include the information of the communication mode of the upper software flat.

For instance, information in the setup packages is: 0x 21 ff 20 00 00 00 00 00, in which, the third byte is the information of the communication mode, and the third byte is set as 0x20 in the case that the information of the communication mode of the upper software flat is 32; the third byte is set as 0x40 in the case that the information of the communication mode of the upper software flat is 64.

It needs to be noted that the control-transmission-channel is a channel, via which the host communicates with the dongle through an endpoint 0 of the dongle; because of the characteristics of the control-transmission-channel, the host can communicate with the dongle via the control-transmission-channel to finish configuration between the host and the dongle before the host can communicate effectively with the dongle via the interrupt-transmission-channel.

Step 306, the upper software flat waits for receiving setting-state information returned from the dongle;

Step 307, the upper software flat outputs information that pull out and re-insert the dongle when the setting-state information returned from the dongle is received by the upper software flat, and Step 303 is executed;

Specifically, the information that pull out and re-insert the dongle can be displayed via the interface of the host to prompt a user to pull out and re-insert the dongle.

Step 308, the upper software flat communicates with the dongle effectively via the interrupt-transmission-channel according to the information of the communication mode of the upper software flat.

Figure 4:
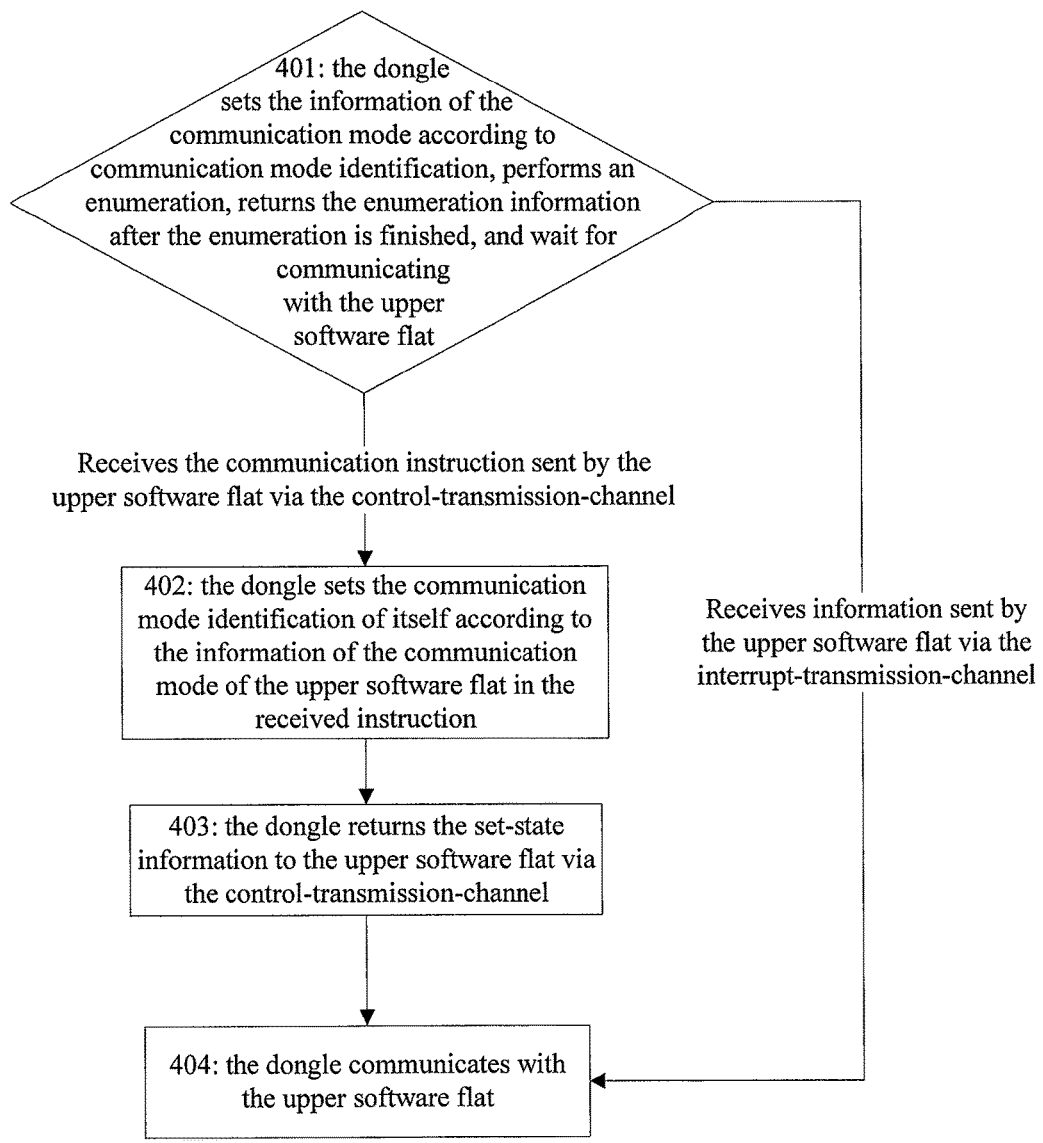
FIG. 4 shows a flow chart of specific operations of a dongle in the method for self-adaption communication of a dongle according to Embodiment 2 of the present invention.

As shown in FIG. 4, in the method, the dongle executes the following steps:

Step 401, the dongle sets the information of the communication mode of the dongle according to a communication mode identification, performs an enumeration, returns enumeration information to the host after the enumeration is finished, waits for communicating with the upper software flat, Step 402 is executed in the case that the communication instruction sent from the upper software flat is received via the control-transmission-channel; Step 404 is executed in the case that the information sent from the upper software flat is received via the interrupt-transmission-channel;

Specifically, the dongle setting the information of the communication mode according to the communication mode identification includes: the number of the communication bytes, supported by the interrupt-transmission-channel, in an endpoint descriptor and a report descriptor of the dongle, is set as same as the communication mode identification, and the number of the communication bytes supported by the interrupt-transmission-channel is made as the information of the communication mode of the dongle. In the present Embodiment 2, the communication mode identification of the dongle is stored in a flag flash. For instance, the number of the communication bytes, supported by the interrupt-transmission-channel, in the endpoint descriptor and the report descriptor of the dongle is set by the dongle according to the communication mode identification as 64 in the case that the communication mode identification of the dongle is 64, thus, the information of the communication mode of the dongle is 64.

The number of the communication bytes, supported by the interrupt-transmission-channel, in the endpoint descriptor and the report descriptor of the dongle is set by the dongle according to the communication mode identification as 32 in the case that the communication mode identification of the dongle is 32, thus, the information of the communication mode of the dongle is 32.

It needs to be noted that, when it connects the host, the dongle sets the information of the communication mode of the dongle according to the communication mode identification, performs the enumeration, the dongle returns the enumeration information to the host after the enumeration is finished, and waits for communicating with the upper software flat, in which, the enumeration information includes the information, such as the transmission channel for the communication of the dongle, the number of the communication bytes supported by each transmission channel, the vendor ID of the dongle, and the product ID.

Step 402, the dongle sets the communication mode identification of itself according to the information of the communication mode of the upper software flat in the received instruction;

Specifically, the dongle receives a series of setup packages sent from the upper software flat via the control-transmission-channel, the setup packages include the information of the communication mode of the upper software flat, the dongle resets the communication mode identification of itself as the same as the information of the communication mode of the upper software flat according to the information of the communication mode of the upper software flat.

For instance, the dongle resets the communication mode identification stored in the flag flash of the dongle as 32 in the case that the information of the communication mode of the upper software flat received by the dongle via the control-transmission-channel is 32.

Step 403, the dongle returns the setting-state information to the upper software flat via the control-transmission-channel, and Step 404 is executed;

Preferably, the setting-state information is 0x9000.

Step 404, the dongle communicates with the upper software flat.

In the present Embodiment 2, the upper software flat sets the information of the communication mode of the upper software flat according to the type of the main board of the host after the upper software flat is started, the upper software flat obtains the information of the communication mode of the dongle according to the enumeration information returned from the dongle to the host when the connection between the dongle and the host is detected by the upper software flat, the upper software flat determines whether the information of the communication mode of itself matches the obtained information of the communication mode of the dongle, if yes, the upper software flat communicates with the dongle effectively via the interrupt-transmission-channel according to the information of the communication mode of the upper software flat; otherwise, the upper software flat sends the communication instruction to the dongle via the control-transmission-channel, and then the dongle resets the communication mode identification of the dongle according to the information of the communication mode of the upper software flat in the instruction after the instruction is received by the dongle, the dongle returns the setting-state information to the upper software flat; the upper software outputs the information that pull out and re-insert the dongle after the setting-state information is received by the upper software flat, in the case that the dongle is pulled out and re-inserted, the dongle is reset, and the information of the communication mode of the dongle is also reset by the dongle according to the communication mode identification, and the enumeration is finished; subsequently, the upper software flat obtains the information of the communication mode of the dongle again when the dongle is reset, then the upper software flat determines that the information of the communication mode of itself is the same as the information of the communication mode of the dongle, and communicates with the dongle effectively according to the information of the communication mode of the upper software flat. In this way, the present invention solves the problem in prior art that a dongle can only support one communication mode of the host, the dongle in the present invention can adapt for both communication modes, and can communicate with the host of both communication modes effectively.

Embodiment 3

Embodiment 3 of the present invention provides a self-adaptive method for communication of a dongle, which applies in a system including a dongle and a host which installs an upper software flat.

Figure 5:
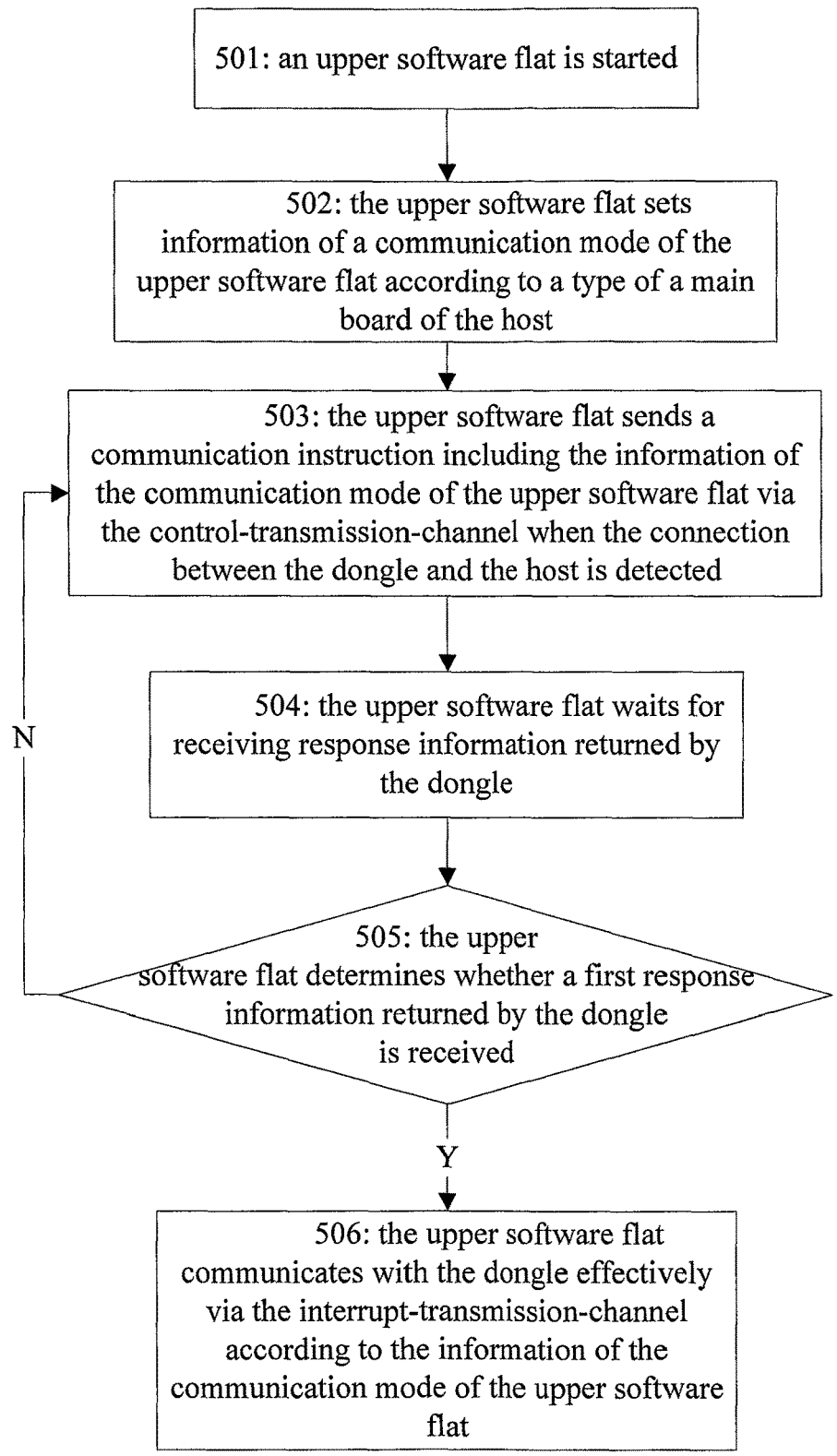
FIG. 5 shows a flow chart of specific operations of an upper software flat in a method for self-adaption communication of a dongle according to Embodiment 3 of the present invention.

As shown in FIG. 5, in the method, the upper software flat executes the following steps:

Step 501, the upper software flat is started;

Specifically, the upper software flat, which is installed in the host, is configured to interact with the dongle to setup an effective communication. In the present invention, the effective communication between the host and the dongle, which includes operation such as reading from the dongle and writing into the dongle by the host, is done via an interrupt-transmission-channel. Because of the characteristics of the interrupt-transmission-channel, the host cannot communicate with the dongle effectively unless a communication mode of the host matches a communication mode of the dongle.

In the present invention, the host may be a personal computer, a personal digital assistant or a mobile computer, etc.

Step 502, the upper software flat sets information of the communication mode of the upper software flat according to a type of a main board of the host;

In the present Embodiment 3, Step 502 specifically includes:

Step a1, the upper software flat obtains the type of the main board of the host by operating system tools of the host;

in which, the operating systems of the host include Windows operating system and Linux operating system, etc; and the types of the main board of the host include GIGABYTE, ASUS, MSI, COLORFUL, ONDA and BIOSTAR, etc.

Specifically, the upper software flat obtains the type of the main board of the host via ManagementObjectSearcher class in an interface provided by a software development kit (SDK) which is under the Windows operating system in the case that the operating system of the host is the Windows operating system; the upper software flat obtains the type of the main board of the host by invoking a dmidecode command provided by a Shell script under the Linux operating system in the case that the operating system is the Linux operating system.

Step a2, the upper software flat obtains the communication mode needed by the host according to the type of the main board;

Specifically, in the present Embodiment 3, the upper software flat obtains the communication mode needed by the host by searching from a preset list, in which, the preset list can only include the type of the main board of the host by which, the communication mode needed is the communication mode of 32 bytes, or can only include the type of the main board of the host by which, the communication mode needed is the communication mode of 64 bytes, or may include the type of the main board and the communication mode needed by the host which uses the type of the main board.

Preferably, in the present Embodiment 3, the preset list just includes the type of the main board of the host by which, the communication mode needed is the communication mode of 32 bytes, such as GIGABYTE; the upper software flat searches an obtained type of the main board from the preset list after the type of the main board of the host is obtained by the upper software flat, the communication mode needed by the host is the communication mode of 32 bytes in the case that the obtained type of the main board is found; otherwise, the communication mode needed by the host is the communication mode of 64 bytes.

For instance, the communication mode needed by the host, which is obtained by the upper software flat by searching from the preset list, is the communication mode of 32 bytes in the case that the type of the main board of the host obtained by the upper software flat is GIGABYTE.

Step a3, the upper software flat sets information of the communication mode of the upper software flat according to the communication mode needed by the host;

Specifically, the information of the communication mode of the upper software flat is set by the upper software flat as 32 in the case that the communication mode needed by the host is the communication mode of 32 bytes; the information of the communication mode of the upper software flat is set by the upper software flat as 64 in the case that the communication mode needed by the host is the communication mode of 64 bytes.

Step 503, the upper software flat sends a communication instruction including the information of the communication mode of the upper software flat to the dongle via a control-transmission-channel when a connection between the dongle and the host is detected by the upper software flat;

The present step specifically includes: the upper software flat checks whether any dongle connects to the host, the upper software flat sends the communication instruction including the information of the communication mode of the upper software flat to the dongle via the control-transmission-channel in the case that the connection between the dongle and the host is detected; the upper software flat outputs information that no dongle is detected in the case that no connection between the dongle and the host is detected.

Specifically, the upper software flat checks whether any dongle connects to the host after the upper software flat is started, the upper software flat specifically checks whether any dongle-inserted information is detected, if yes, the upper software flat obtains a vendor ID and a product ID according to an enumeration information returned from the dongle to the host, and compares the vendor ID and the product ID with a preset vendor ID and a preset product ID of dongle respectively, the upper software flat sends the communication instruction including the information of the communication mode of the upper software flat to dongle via the control-transmission-channel in the case that the vendor ID is same as the preset vendor ID of the dongle and the product ID is same as the preset product ID of the dongle; otherwise, the upper software flat outputs the information that no dongle is detected; if no connection between the host and the dongle is detected, the upper software flat outputs the information that no dongle is detected, in which, the information that no dongle is detected output by the upper software flat can be prompted through the interface of the host that no information of dongle can be detected.

Specifically, the upper software flat sets the communication instruction according to the information of the communication mode of the upper software flat, and sends the communication instruction to the dongle via the control-transmission-channel, in which, the communication instruction is composed of a series of setup packages which include the information of the communication mode of the upper software flat.

For instance, the specific information in the setup packages is: 0x 25 ff 20 00 00 00 00 00, in which, the third byte is the information of the communication mode, the third byte is set as 0x20 in the case that the information of the communication mode of the upper software flat is 32; the third byte is set as 0x40 in the case that the information of the communication mode of the upper software flat is 64.

It needs to be noted that the control-transmission-channel is a channel for communication between the host and the dongle via an endpoint 0 of the dongle, because of characteristics of the control-transmission-channel, the host can communicate with the dongle via the control-transmission-channel to finish the configuration between the host and the dongle before the host can communicate effectively with the dongle via an interrupt-transmission-channel.

Step 504, the upper software flat waits for receiving response information returned from the dongle;

Step 505, the upper software flat determines whether a first response information returned from the dongle is received, if yes, Step 506 is executed; otherwise, Step 503 is returned to;

Step 506, the upper software communicates with the dongle effectively via an interrupt-transmission-channel according to the information of the communication mode of the upper software flat.

Figure 6:
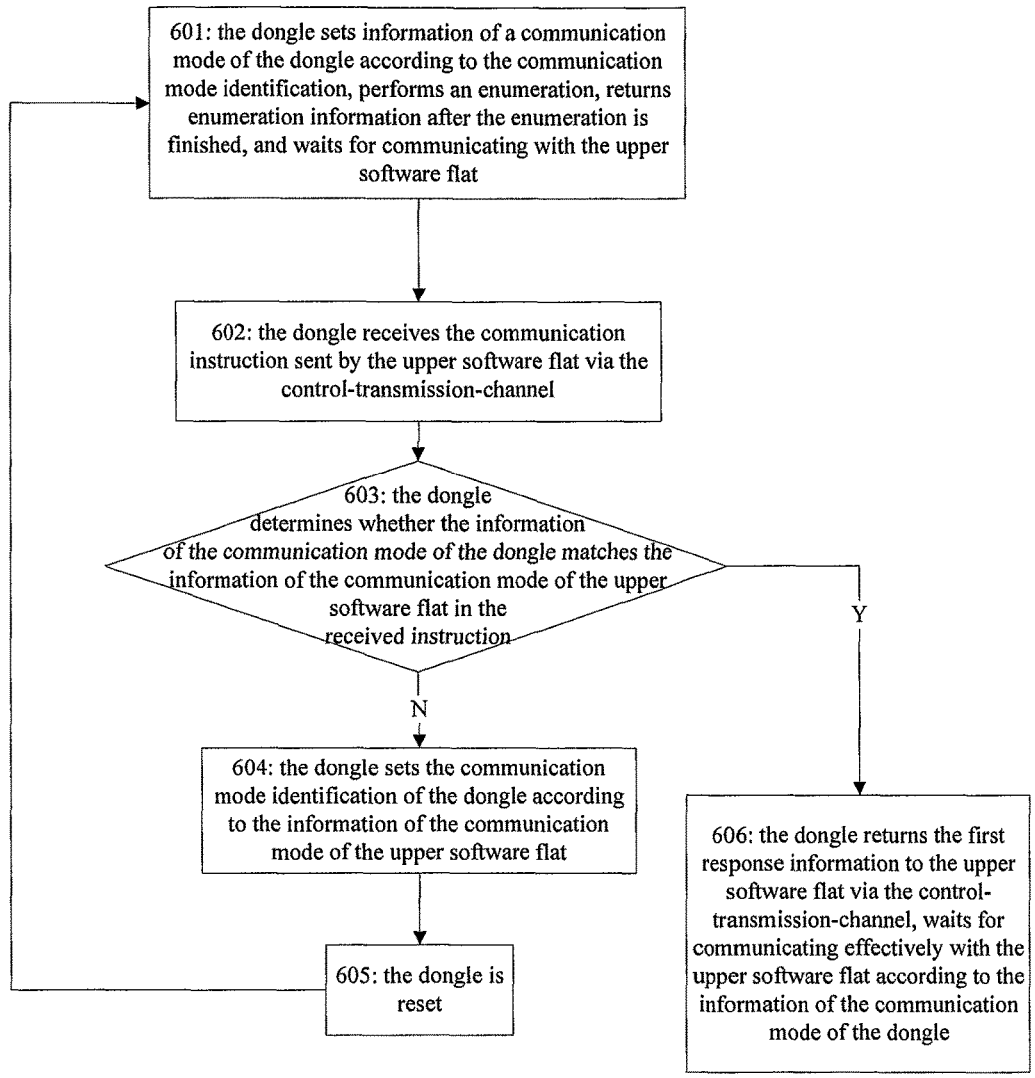
FIG. 6 shows a flow chart of specific operations of a dongle in the method for self-adaption communication of a dongle according to Embodiment 3 of the present invention.

As shown in FIG. 6, in the method, the dongle executes following steps:

Step 601, the dongle sets the information of the communication mode of the dongle according to a communication mode identification, performs an enumeration, returns enumeration information to the host after the enumeration is finished, waits for communicating with the upper software flat;

Specifically, the dongle setting the information of the communication mode according to the communication mode identification includes: the number of communication bytes, supported by the interrupt-transmission-channel, in an endpoint descriptor and a report descriptor of the dongle, is set as same as the communication mode identification, and the number of the communication bytes supported by the interrupt-transmission-channel is made as the information of the communication mode of the dongle. In the present Embodiment 3, the communication mode identification of the dongle is stored in a flag flash. For instance, the number of the communication bytes, supported by the interrupt-transmission-channel, in the endpoint descriptor and the report descriptor of the dongle is set by the dongle according to the communication mode identification as 64 in the case that the communication mode identification of the dongle is 64, thus, the information of the communication mode of the dongle is 64.

The number of the communication bytes, supported by the interrupt-transmission-channel, in the endpoint descriptor and the report descriptor of the dongle is set by the dongle according to the communication mode identification as 32 in the case that the communication mode identification of the dongle is 32, thus, the information of the communication mode of the dongle is 32.

It needs to be noted that, when it connects the host, the dongle sets the information of the communication mode of the dongle according to the communication mode identification, performs the enumeration, the dongle returns the enumeration information to the host after the enumeration is finished, and waits for communicating with the upper software flat, in which, the enumeration information includes the information, such as the transmission channel for the communication of the dongle, the number of the communication bytes supported by each transmission channel, the vendor ID of the dongle, and the product ID.

Step 602, the dongle receives the communication instruction sent from the upper software flat via the control-transmission-channel;

Specifically, the dongle receives a series of setup packages sent from the upper software flat via the control-transmission-channel, the setup packages include the information of the communication mode of the upper software flat.

Step 603, the dongle determines whether the information of the communication mode of the dongle matches the information of the communication mode of the upper software flat in the received instruction, if yes, Step 606 is executed; otherwise, Step 604 is executed;

Specifically, the dongle determines whether the information of the communication mode of the dongle is the same as the information of the communication mode of the upper software flat in the received instruction, if yes, the information of the communication mode of the dongle matches the information of the communication mode of the upper software flat; otherwise, the information of the communication mode of the dongle does not match the information of the communication mode of the upper software flat.

For instance, the information of the communication mode of the dongle does not match the information of the communication mode of the upper software flat in the case that the information of the communication mode of the dongle is 64, and the information of the communication mode of the upper software flat is 32.

Step 604, the dongle sets the communication mode identification of the dongle according to the information of the communication mode of the upper software flat;

Specifically, the dongle sets the communication mode identification stored in the flag flash according to the information of the communication mode of the upper software flat in the instruction.

For instance, the communication mode identification stored in the flag flash is set as 32 by the dongle in the case that the information of the communication mode of the upper software flat in the instruction is 32.

Step 605, the dongle is reset, and Step 601 is returned to;

Specifically, the dongle lowers an electrical level of a chip-reset-pin after the communication mode identification stored in the flag flash is set by the dongle, and hardware of the dongle is reset.

Step 606, the dongle returns the first response information to the upper software flat via the control-transmission-channel, and waits for communicating with the upper software flat effectively according to the information of the communication mode of the dongle;

Preferably, the first response information is 0x9001.

In the present Embodiment 3, the upper software flat sets the communication mode information of the upper software flat according to the type of the main board of the host after the upper software flat is started, the upper software flat sends the communication instruction including the communication mode information of the upper software flat to the dongle via the control-transmission-channel when the connection between the dongle and the host is detected by the upper software flat; the dongle determines whether the communication mode of the dongle is as same as the communication mode of the upper software flat according to the communication mode information of the upper software flat in the instruction when the communication instruction is received by the dongle via the control-transmission-channel, if yes, the dongle returns a corresponding response information to the upper software flat, the upper software flat communicates with the dongle effectively via the interrupt-transmission-channel according to the communication mode information of the upper software flat after the response information is received by the upper software flat; otherwise, the dongle changes the communication mode of the dong according to the communication mode of the upper software flat, and then the dongle is reset, and reset the communication mode information of the dongle according to the communication mode identification, finishes the enumeration; the upper software flat detects again that the dongle connects to the host when the dongle is reset, and the upper software flat sends the communication instruction to the dongle again, in this way, the dongle determines that the communication mode of itself is same as the communication mode of the upper software after the instruction information is received, thus, the dongle returns the corresponding response information to the upper software flat, the upper software flat communicates with the dongle effectively via the interrupt-transmission-channel according to the communication mode information of the upper software flat after the response information is received by the upper software flat. By the present invention, it solves the problem in prior art that a dongle can only support one communication mode of the host, the dongle in the present invention can adapt for both communication modes, and can communicate with the host of both communication modes effectively.

Embodiment 4

Embodiment 4 of the present invention provides a self-adaptive method for communication of a dongle, which applies in a system including a dongle and a host, in which an upper software flat is installed in.

Figure 7:
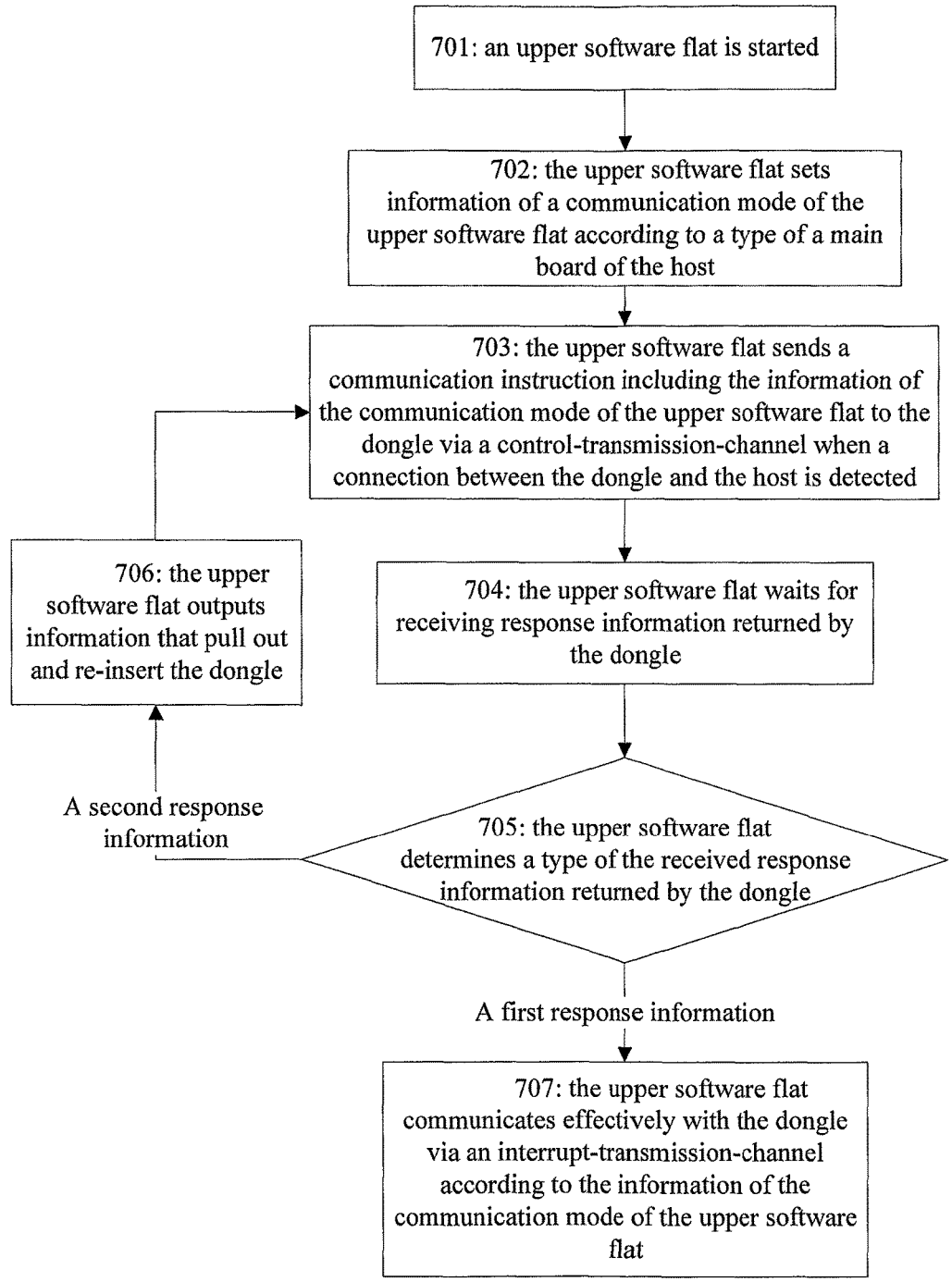
FIG. 7 shows a flow chart of specific operations of an upper software flat in a method for self-adaption communication of a dongle according to Embodiment 4 of the present invention.

As shown in FIG. 7, in said method, the upper software flat executes following steps:

Step 701, the upper software flat is started;

Specifically, the upper software flat, which is installed in the host, is configured to interact with the dongle to set up an effective communication between the host and the dongle. In the present invention, the effective communication between the dongle and the host, which includes operation such as reading from and writing into the dongle, is done via an interrupt-transmission-channel. Because of the characteristics of the interrupt-transmission-channel, the host cannot communicate with the dongle effectively unless a communication mode of the host matches a communication mode of the dongle.

In the present invention, the host may by a personal computer, a personal digital assistant or a mobile computer.

Step 702, the upper software flat sets information of the communication mode of the upper software flat according to a type of a main board of the host;

In the present Embodiment 4, Step 702 specifically includes:

Step a1, the upper software flat obtains the type of the main board of the host by operating system tools of the host; in which, the operating systems of the host include Windows operating system and Linux operating system, etc; the types of the main board of the host include GIGABYTE, ASUS, MSI, COLORFUL, ONDA and BIOSTAR, etc.

Specifically, the upper software flat obtains the type of the main board of the host via ManagementObjectSearcher class in an interface provided by a software development kit (SDK) which is under the Windows operating system in the case that the operating system of the host is the Windows operating system; the upper software flat obtains the type of the main board of the host by invoking a dmidecode command provided by a Shell script under the Linux operating system in the case that the operating system of the host is the Linux operating system.

Step a2, the upper software flat obtains a communication mode needed by the host according to the type of the main board;

Specifically, in the present Embodiment 4, the upper software flat obtains the communication mode needed by the host by searching from a preset list, in which, the preset list may only include the type of the main board of the host, by which, the communication mode needed is the communication mode of 32 bytes, or only include the type of the main board of the host, by which, the communication mode needed is the communication mode of 64 bytes; the preset list may include a type of a main board and the communication mode needed by the host which applies the type of the main board.

Preferably, in the present Embodiment 4, the preset list only includes the type of the main board of the host, by which, the communication mode needed is the communication mode of 32 byte, such as GIGABYTE; the upper software flat searches an obtained type of the main board from the preset list after the type of the main board of the host is obtained by the upper software flat, the communication mode needed by the host is the communication mode of 32 bytes if the obtained type of the main board is found; the communication mode needed by the host is the communication mode of 64 bytes if the obtained type of the main board is not found.

For instance, the communication mode needed by the host, which is obtained by the upper software flat by searching from the preset list, is the communication mode of 32 bytes in the case that the type of the main board of the host, obtained by the upper software flat, is GIGABYTE.

Step a3, the upper software flat sets the information of the communication mode of the upper software flat according to the communication mode needed by the host;

Specifically, the information of the communication mode of the upper software flat is set by the upper software flat as 32 in the case that the communication mode needed by the host is the communication mode of 32 bytes; the communication mode of the upper software flat set by the upper software flat as 64 in the case that the communication mode needed by the host is the communication mode of 64 bytes.

Step 703, the upper software flat sends a communication instruction including the information of the communication mode of the upper software flat to the dongle via an interrupt-transmission-channel when a connection between the host and the dongle is detected by the upper software flat;

The present step specifically includes: the upper software flat checks whether any dongle connects to the host, the upper software flat sends the communication instruction including the information of the communication mode of the upper software flat to the dongle via the interrupt-transmission-channel if a dongle is detected to connect to the host; the upper software flat outputs information that no dongle is detected if no dongle is detected to connect to the host.

Specifically, the upper software flat checks whether any dongle connects to the host when the upper software flat is started, that means the upper software flat specifically checks whether any dongle-inserted information is detected, the upper software flat obtains a vendor ID (VID) and a product ID (PID) according to enumeration information returned from the dongle to the host when a dongle-inserted information is detected, and the VID and the PID is compared with a preset VID of the dongle and a preset PID of the dongle respectively, the upper software flat sends the communication instruction including the information of the communication mode of the upper software flat to the dongle via the interrupt-transmission-channel in the case that the obtained VID is as same as the preset VID of the dongle and the obtained PID is as same as the preset PID of the dongle; otherwise, the upper software flat outputs the information that no dongle is detected; the upper software flat outputs information that no dongle is detected in the case that no dongle is detected to connect to the host, in which, the information that no dongle is detected output by the upper software flat can be displayed on an interface of the host that no dongle is detected.

Specifically, the upper software flat sets the communication instruction according to the information of the communication mode of the upper software flat, and sends the communication instruction including the information of the communication mode of the upper software flat to the dongle via a control-transmission-channel, in which, the communication instruction is composed of a series of setup packages which includes the information of the communication mode of the upper software flat.

For instance, the specific information in the setup packages includes 0x 27 ff 20 00 00 00 00 00, in which, the third byte is the information of the communication mode, the third bytes is set as 0x20 in the case that the information of the communication mode of the upper software flat is 32; the third byte is set as 0x40 in the case that the information of the communication mode of the upper software flat is 64.

It needs to be noted that the control-transmission-channel is a channel for communication between the host and the dongle via an endpoint 0 of the dongle; because of the characteristics of the control-transmission-channel, the host can communicate with the dongle via the control-transmission-channel before the host can communicate with the dongle effectively via the interrupt-transmission-channel to finish a configuration between the host and the dongle.

Step 704, the upper software flat waits for receiving response information returned from the dongle;

Step 705, the upper software flat determines a type of the received response information returned from the dongle, Step 707 is executed in the case that the response information is a first response information; Step 706 is executed in the case that the response information is a second response information;

Step 706, the upper software flat outputs information that pull out and re-insert the dongle, Step 703 is returned to;

Specifically, the upper software flat prompts that pull out and re-insert the dongle again by displaying information that pull out and re-insert the dongle again on the interface of the host.

Step 707, the upper software flat communicates with the dongle via the interrupt-transmission-channel effectively according to the information of the communication mode of the upper software flat.

Figure 8:
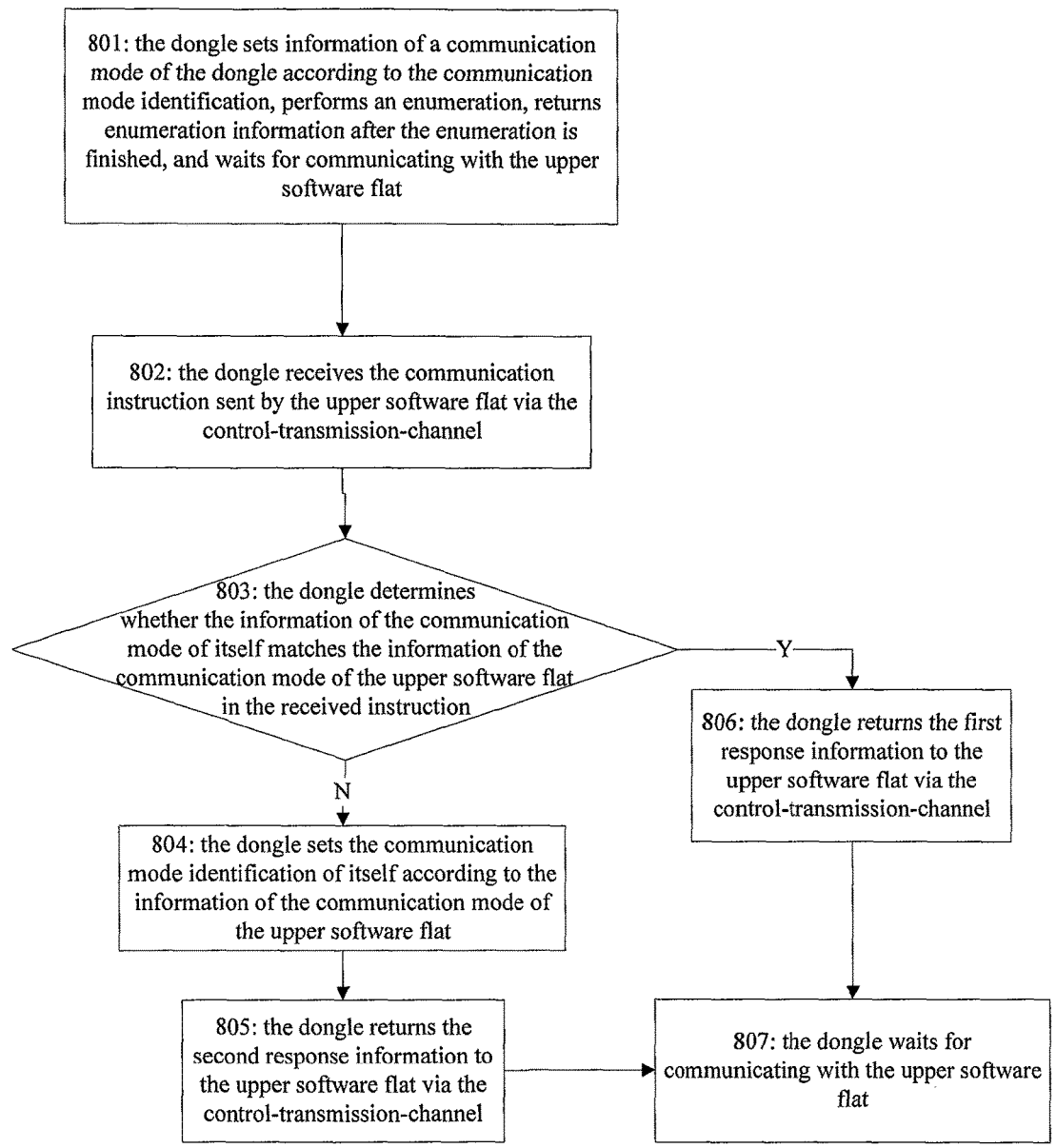
FIG. 8 shows a flow chart of specific operations of a dongle in the method for self-adaption communication of a dongle according to Embodiment 4 of the present invention.

As shown in FIG. 8, in the method, the dongle executes the following steps:

Step 801, the dongle sets information of the communication mode of the dongle according to a communication mode identification, performs an enumeration, returns enumeration information to the host after the enumeration is finished, and waits for communicating with the upper software flat;

Specifically, the dongle setting the information of the communication mode of the dongle according to the communication mode identification includes: the number of communication bytes, supported by the interrupt-transmission-channel, in an endpoint descriptor and a report descriptor of the dongle is set as the same as the communication mode identification, and the number of the communication bytes supported by the interrupt-transmission-channel is made as the information of the communication mode of the dongle. In the present Embodiment 4, the communication mode identification of the dongle is stored in flat flash. For instance, the number of the communication bytes, supported by the interrupt-transmission-channel, in the endpoint descriptor and the report descriptor of the dongle is set by the dongle as 64 according to the communication mode identification in the case that the communication mode identification of the dongle is 64, thus, the information of the communication mode of the dongle is 64;

The number of the communication bytes, supported by the interrupt-transmission-channel, in the endpoint descriptor and the report descriptor of the dongle is set by the dongle as 32 according to the communication mode identification in the case that the communication mode identification of the dongle is 32, thus, the information of the communication mode of the dongle is 32.

It needs to be noted that the dongle sets the information the communication mode of the dongle according to the communication mode identification when the dongle connects to the host, performs the enumeration, returns the enumeration information to the host after the enumeration is finished; in which, the enumeration information includes a transmission channel for communication of the dongle, the number of communication bytes supported by each transmission channel, a vendor ID (VID) of the dongle and a product ID (PID), the dongle waits for communicating with the upper software flat.

Step 802, the dongle receives the communication instruction sent from the upper software flat via the control-transmission-channel;

Specifically, the dongle receives a series of setup packages sent from the upper software flat via the control-transmission-channel, and the setup packages include the information of the communication mode of the upper software flat.

Step 803, the dongle determines whether the information of the communication mode of itself matches the information of the communication mode of the upper software flat in the received instruction, if yes, Step 806 is executed; otherwise, Step 804 is executed;

Specifically, the dongle determines whether the information of the communication mode of itself is the same as the information of the communication mode of the upper software in the received instruction, if yes, the information of the communication mode of the dongle matches the information of the communication mode of the upper software flat; otherwise, the information of the communication mode of the dongle does not match the information of the communication mode of the upper software flat.

For example, the information of the communication mode of the dongle does not match the information of the communication mode of the upper software flat in the case that the information of the communication mode of the dongle is 64 while the information of the communication mode of the upper software flat received by the dongle is 32.

Step 804, the dongle sets the communication mode identification of the dongle according to the information of the communication mode of the upper software flat;

Specifically, the dongle sets the communication mode identification stored in the flag flash according to the information of the communication mode of the upper software flat.

For example, the dongle sets the communication mode identification stored in the flag flash as 32 in the case that the information of the communication mode of the upper software flat is 32.

Step 805, the dongle returns the second response information to the upper software flat via the control-transmission-channel, Step 807 is executed;

Preferably, the second response information is 0x9002.

Step 806, the dongle returns the first response information to the upper software flat via the control-transmission-channel, and Step 807 is executed;

Preferably, the first response information is 0x9001.

Step 807, the dongle waits for communicating with the upper software flat.

In the present Embodiment 4, the upper software flat sets the communication mode information of the upper software flat according to the type of the main board of the host after the upper software flat is started, the upper software flat sends the communication instruction including the communication mode information of the upper software flat to the dongle via the control-transmission-channel when a connection between the host and the dongle is detected by the upper software flat; the dongle determines whether the communication mode of the dongle is as same as the communication mode of the upper software flat according to the communication mode information of the upper software flat in the instruction when the dongle receives the communication instruction via the control-transmission-channel, if yes, the dongle returns the first response information to the upper software flat, and the upper software flat communicates effectively with dongle via the interrupt-transmission-channel according to the communication mode information of the upper software flat after the first response information is received; otherwise, the dongle changes the communication mode of the dongle according to the communication mode of the upper software flat, and then returns the second response information to the upper software flat; the upper software flat outputs the information that pull out and re-insert the dongle, and the dongle reset the communication mode information of the dongle according to the communication mode identification in the case that the dongle is reset, and the dongle performs the enumeration; when the dongle is reset, the upper software will detect connection between the dongle and the host again, and sends the communication instruction to the dongle again, in this way, the dongle determines that the communication mode of itself is just the same as the communication mode of the upper software flat after the instruction information is received by the dongle, thus, the dongle will return the first response information to the upper software flat, and the upper software flat communicates effectively with the dongle via the interrupt-transmission-channel according to the communication mode information of the upper software flat after the first response information is received by the upper software flat. By the present invention, it solves the problem in prior art that a dongle can only support one communication mode of the host, the dongle in the present invention can adapt for both communication modes, and can communicate with the host of both communication modes effectively.

The invention claimed is:

1. A self-adaptive method for communication of a dongle, which applies for a system including a dongle and a host which has an upper software flat, wherein
the upper software flat executes the following steps:
Step s1, setting, by the upper software flat, information of a communication mode of the upper software flat according to a type of a main board of the host;
Step s2, obtaining, by the upper software flat, information of a communication mode of the dongle according to enumeration information returned from the dongle to the host when a connection between the dongle and the host is detected by the upper software flat;
Step s3, determining, by the upper software flat, whether the information of the communication mode of itself matches the information of the communication mode of the dongle, if yes, executing Step s5; otherwise, executing Step s4;
Step s4, sending, by the upper software flat, a communication instruction which includes the information of the communication mode of the upper software flat to the dongle via a control-transmission-channel, returning to Step s2; and
Step s5, communicating, by the upper software flat, with the dongle effectively via an interrupt-communication-channel according to the information of the communication mode of the upper software flat; and
the dongle executes the following steps:
Step r1, setting, by the dongle, the information of the communication mode of the dongle according to a communication mode identification of the dongle, performing an enumeration, returning enumeration information to the host after the enumeration is finished, and waiting for communicating with the upper software flat;
Step r2, communicating, by the dongle, with the upper software flat in the case that the dongle receives information sent from the upper software flat via the interrupt-transmission-channel; executing Step r3 in the case that the dongle receives a communication instruction sent from the upper software flat via the control-transmission-channel;
Step r3, setting, by the dongle, the communication mode identification of the dongle according to the information of the communication mode of the upper software flat in the communication instruction sent from the upper software flat;
Step r4, resetting the dongle; or, returning, by the dongle, set-state information to the upper software flat;
when the dongle is reset in Step r4, after the upper software flat sends the communication instruction including the information of the communication mode of the upper software flat to the dongle via the control-transmission-channel, the step further comprising:
waiting, by the upper software flat, for receiving the set-state information returned from the dongle, and outputting prompt information to pull out or insert the dongle again when the set-state information returned from the dongle is received.

2. The method as claimed in claim 1, wherein, Step s2 further comprises: checking, by the upper software flat, whether any dongle connects to the host, the upper software flat obtaining the information of the communication mode of the dongle according to the enumeration information returned from the dongle to the host in the case that a dongle is detected to connect to the host; and the upper software flat outputting information that no dongle is detected in the case that no dongle is detected to connect to the host.

3. The method as claimed in claim 1, wherein, Step s1 specifically comprises:
Step a1, obtaining, by the upper software flat, the type of the main board of the host via operating system tools of the host;
Step a2, obtaining, the upper software flat, a communication mode needed by the host according to the type of the main board; and
Step a3, setting, by the upper software flat, the information of the communication mode of the upper software flat according to the communication mode needed by the host.

4. The method as claimed in claim 3, wherein, Step a2 specifically comprises: obtaining, by the upper software flat, the communication mode needed by the host by searching from a preset list according to the type of the main board.

5. The method as claimed in claim 4, wherein, the preset list comprises the type of the main board.

6. The method as claimed in claim 5, wherein, the type of the main board specifically is the type of the main board which needs a communication mode of 32 bytes.

7. The method as claimed in claim 5, wherein, the type of the main board specifically is the type of the main board which needs a communication mode of 64 bytes.

8. The method as claimed in claim 5, wherein, the preset list further comprises a communication mode needed by a host which uses the type of the main board.

9. A self-adaptive method for communication of a dongle, which applies for a system including a dongle and a host which has an upper software flat, wherein the upper software flat executes the following steps:

Step s1, setting, by the upper software flat, information of a communication mode of the upper software flat according to a type of a main board of the host;

Step s2, sending, by the upper software flat, a communication instruction including the information of the communication mode of the upper software flat to the dongle via a control-transmission-channel when a connection between the dongle and the host is detected by the upper software flat;

Step s3, waiting, by the upper software flat, for receiving response information returned from the dongle; and Step s4, communicating, by the upper software flat, with the dongle effectively via an interrupt-communication-channel according to the information of the communication mode of the upper software flat after a first response information returned from the dongle is received by the upper software flat; and the dongle executes the following steps:

Step r1, setting, by the dongle, information of a communication mode of the dongle according to a communication mode identification of itself, performing an enumeration, returning enumeration information to the host after the enumeration is finished, and waiting for communicating with the upper software flat;

Step r2, receiving, by the dongle, the communication instruction sent from the upper software flat via the control-transmission-channel;

Step r3, determining, by the dongle, whether the information of the communication mode of the dongle itself matches the information of the communication mode of the upper software flat, which is included in the communication instruction sent from the upper software flat, if yes, returning a first response information to the upper software flat, and communicating with the upper software flat; otherwise, executing Step r4;

Step r4, setting, by the dongle, the communication mode identification of the dongle according to the information of the communication mode of the upper software flat; and Step r5, resetting the dongle; or returning, by the dongle, a second response information to the upper software flat;

in the case that the second response information is returned from the dongle to the upper software flat in Step r4, after Step s3, the method further including: outputting, by the upper software flat, prompt information on pulling out or inserting the dongle again after the second response information is received by the upper software flat from the dongle.

10. The method as claimed in claim 9, wherein Step s2 specifically comprises: determining, by the upper software flat, whether any dongle connects to the host, the upper software flat sending the communication instruction including the information of the communication mode of the upper software flat to the dongle via the control-transmission-channel in the case that a dongle is detected to connect to the host; the upper software flat outputting the prompt information that no dongle is detected in the case that no dongle is detected by the upper software flat to connect to the host.

11. The method as claimed in claim 9, wherein, Step s1 specifically comprises:

Step a1, obtaining, by the upper software flat, the type of the main board of the host by the operating system tools of the host;

Step a2, obtaining, by the upper software flat, a communication mode needed by the host according to the type of the main board of the host; and Step a3, setting, by the upper software flat, the information of the communication mode of the upper software flat according to the communication mode needed by the host.

12. The method as claimed in claim 11, wherein, Step a2 specifically comprises: obtaining, by the upper software, the communication mode needed by the host by searching a preset list according to the type of the main board.

13. The method as claimed in claim 12, wherein, the preset list comprises the type of the main board.

14. The method as claimed in claim 13, wherein the type of the main board specifically is the type of the main board which needs the communication mode of 32 bytes.

15. The method as claimed in claim 13, wherein the type of the main board specifically is the type of the main board which needs the communication mode of 64 bytes.

16. The method as claimed in claim 13, wherein, the preset list further comprises a communication mode needed by a host which uses the type of the main board.

* * * * *